(12) United States Patent
Huang et al.

(10) Patent No.: US 12,481,394 B1
(45) Date of Patent: Nov. 25, 2025

(54) THREE DIMENSIONAL PROXIMITY DETECTION FOR INFORMATION HANDLING SYSTEM

(71) Applicant: Dell Products L.P., Round Rock, TX (US)

(72) Inventors: Hong-Ji Huang, Taipei (TW); Yi-Fan Wang, Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/785,302

(22) Filed: Jul. 26, 2024

(51) Int. Cl.
  *G06F 3/041* (2006.01)
(52) U.S. Cl.
  CPC .............................. *G06F 3/04166* (2019.05)
(58) Field of Classification Search
  None
  See application file for complete search history.

(56) References Cited

U.S. PATENT DOCUMENTS

| | | | |
|---|---|---|---|
| 11,216,135 B2 * | 1/2022 | Tabata | G06F 3/0446 |
| 2013/0278560 A1 * | 10/2013 | Yamaguchi | G06F 3/0445 345/174 |
| 2020/0150805 A1 * | 5/2020 | Kim | G06F 3/044 |

* cited by examiner

*Primary Examiner* — Krishna P Neupane
(74) *Attorney, Agent, or Firm* — Terrile, Cannatti & Chambers, LLP; Emmanuel A. Rivera

(57) ABSTRACT

Described herein are methods and systems for switching between a normal scanning mode and a proximity detection mode for a touchscreen of an information handling system, such as a laptop or notebook personal computer. When the information handling system is in idle mode, proximity detection is enabled, by grouping sensors of the touchscreen to transmit and to received, creating an electric field. If a user's finger or pointing device enters or breaks the electric field, user presence is detected and the system switches to normal or scanning mode.

20 Claims, 4 Drawing Sheets

THREE DIMENSIONAL PROXIMITY DETECTION FOR INFORMATION HANDLING SYSTEM

BACKGROUND OF THE INVENTION

Field of the Invention

The present invention relates to information handling systems. More specifically, embodiments of the invention provide for user proximity detection for information handling systems, such as notebook or laptop computers.

Description of the Related Art

As the value and use of information continues to increase, individuals and businesses seek additional ways to process and store information. One option available to users is information handling systems. Information handling systems include personal computers (PC), server computers, such as desktops. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For information systems, such as laptop or notebook computer systems, touch displays or screens (touchscreen) can be implemented. The touchscreen senses operator presence, when a user touches the sensors of the touchscreen. Touchscreens are implemented detect operator presence in two dimensions. Implementations provide for touchscreen to include an array of sensors, such that when a user touches the sensors, an indication is provided as to operator/user presence. The array of sensors also indicate location of a user finger/pointing device for on screen tracking when the computer system is active.

In order to conserve power, when inactive, the computer system can go into a sleep/inactive mode. In a sleep or power saving mode, implementations provide for touch screen rate and display refresh rate of the computer system can be lowered. In other words, when no touch is sensed or touch signal detected by the touchscreen, touch screen rate and display refresh screen rate are lowered.

Implementations can provide for a computer systems to be awaken from sleep mode by a user action. The computer system may stay in an idle mode with a lowered scan and display refresh rate until the user unlocks the computer system with a touch to the touchscreen or keyboard input. If an unlock action does not occur, the computer system can go back to sleep mode in order to consume lower power.

Therefore, to bring back the computer system from sleep or power saving mode, and to increase the display refresh rate, the computer system, and in particular the touchscreen, has to effectively sense a user. There can be significant latency between display refresh rates. If a user is not sensed or effectively detected by a touchscreen, bringing back up (i.e., awaken) the computer system may not occur, or a significant delay can be experienced. Therefore, there becomes a need to efficiently a user for information handling systems, such as laptop or notebook computers.

SUMMARY OF THE INVENTION

A computer-implementable method, system and non-transitory, computer-readable storage medium for switching touchscreen mode from normal to proximity detecting comprising determining if touchscreen of a system is in normal mode; entering an idle mode if system has been inactive for a certain time period; providing proximity detecting if the system has been inactive for the certain time period, wherein proximity detecting comprises: grouping sensors of the touchscreen as transmit sensors and receive sensors; driving the transmit sensors and receive sensors to create an electric field; detecting a user when a finger or pointing device enters the electric field; and switching to a normal or scanning mode a detecting the user occurs.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Implementations herein provide for a laptop or notebook computer to include three dimensional sensing touchscreen with a shunt mode sensor. For proximity detection, a configuration is provided for a combined sensor area that includes a group of sensors array used for transmitting, a group of sensors used for receiving, and a group of sensors spaced between the arrays for transmitting and receiving. An electric field is created by the transmitting and receiving sensors. When a finger or pointing device enters the electric field capacitance is induced, indicating user presence.

The touchscreen is switched between two dimensional sensing and three dimensional sensing. Two dimensional sensing configuration is provided when the laptop or notebook computer is in normal operating mode. The three dimensional sensing configuration is provided when the laptop or notebook computer is in idle mode. The three dimensional sensing is used for proximity detection, when a finger or pointing device enters the electric field. It is also contemplated, that the described methods and systems can provide for hovering detection, gesture recognition and a screen unlock gesture.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, gaming, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
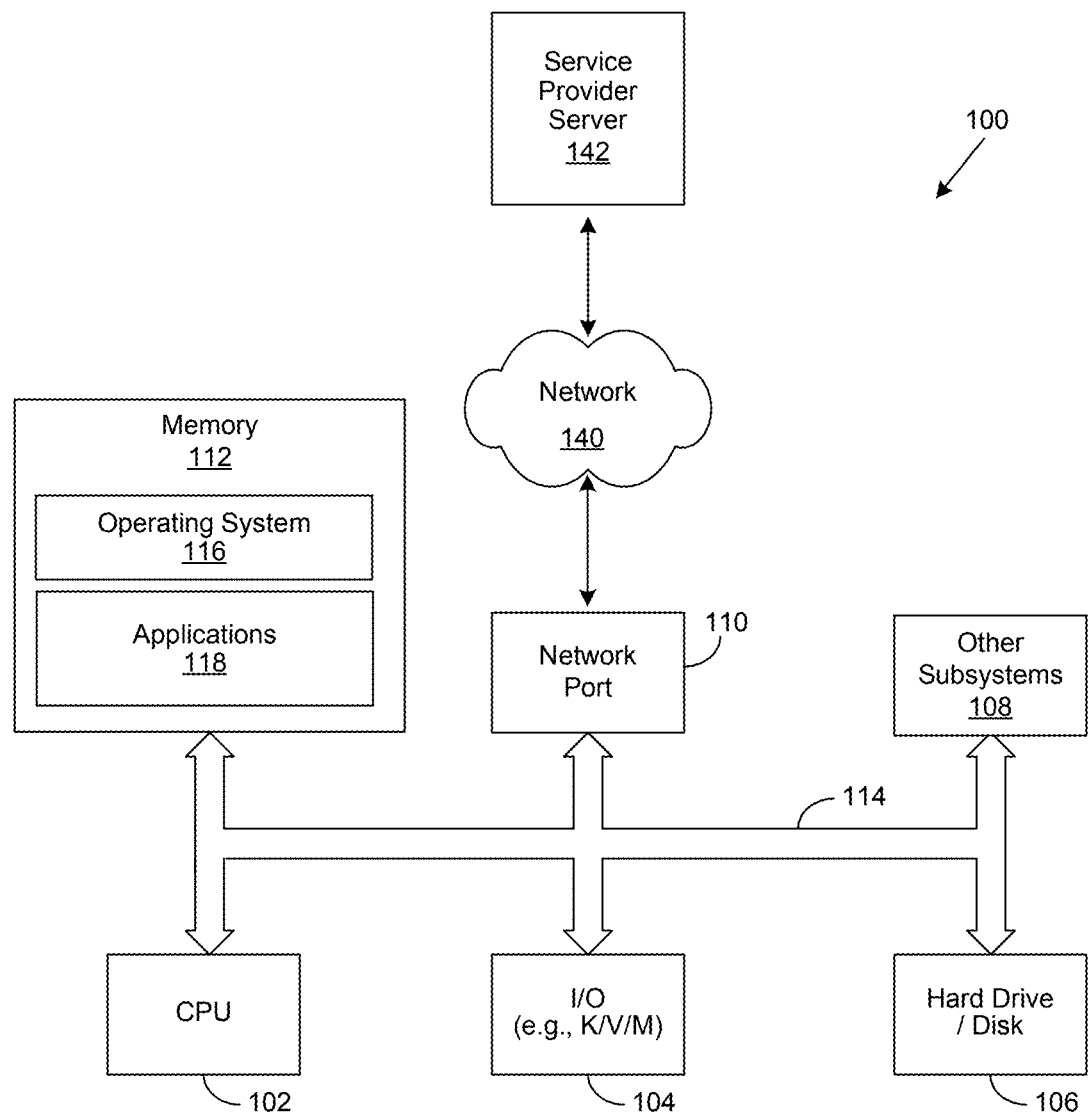
FIG. 1 is a general illustration of components of an information handling system as implemented in the present invention.

FIG. 1 is a generalized illustration of an information handling system 100 that can be used to implement the system and method of the present invention. The information handing system 100 can be a host to the peripheral devices described herein. The information handling system 100 can include desktop computer, server computer, a laptop or notebook personal computer (PC), PC integrated into a keyboard, etc. In particular, implementations described herein provide for a laptop or notebook PC or system.

The information handling system 100 includes a processor (e.g., central processor unit or "CPU") 102, input/output (I/O) devices 104, such as a microphone, a keyboard, a video/display, a mouse, and associated controllers (e.g., K/V/M), a hard drive or disk storage 106, and various other subsystems 108. In particular, I/O devices 104 include a touchscreen as further described herein.

In various embodiments, the information handling system 100 also includes network port 110 operable to connect to a network 140, where network 140 can include one or more wired and wireless networks, including the Internet. Network 140 is likewise accessible by a service provider server 142. The information handling system 100 likewise includes system memory 112, which is interconnected to the foregoing via one or more buses 114. System memory 112 can be implemented as hardware, firmware, software, or a combination of such. System memory 112 further includes an operating system (OS) 116. Embodiments further provide for the system memory 112 to include software applications 118.

Figure 2:
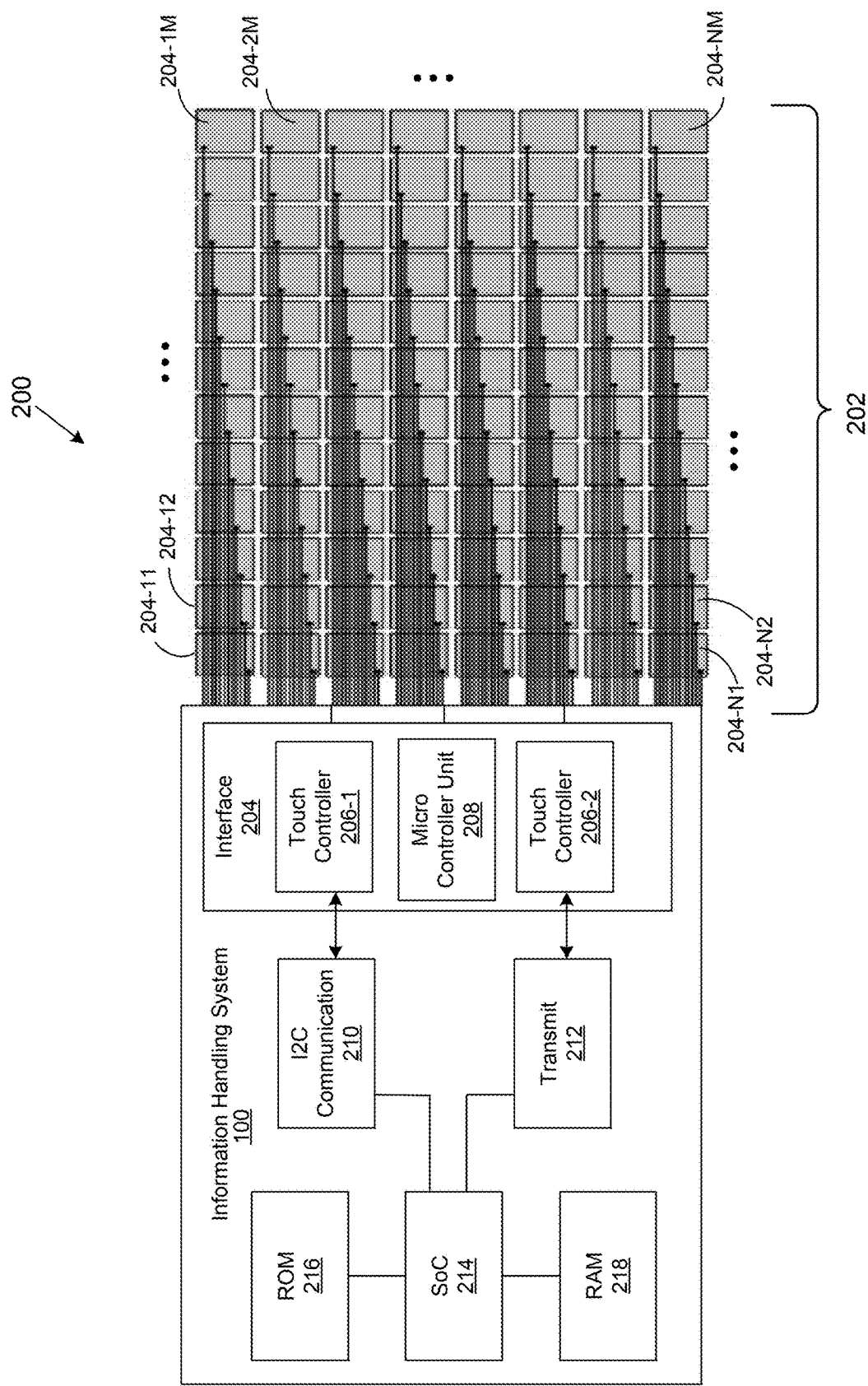
FIG. 2 is a system configuration implementing a touchscreen as implemented in the present invention.

FIG. 2 is an example system configuration implementing a touchscreen as implemented in the present invention. The system configuration 200 includes a touchscreen 202. As described touchscreen 202 can be considered as an I/O device 104 of an information handling system 100 (i.e., laptop or notebook PC or system). The touchscreen 202 can be embodied as a liquid crystal display (LCD) touchscreen.

Implementations provide for the touchscreen 202 to be a self-capacitance touch screen providing multi-touch features with a function for zoom in and zoom out for screen size. Touch screen 202 includes an array of sensors 204-11 to 204-NM, wherein the array is made of N rows and M columns of sensors 204. For a self-capacitance touch screen, each of the sensors 204 can be connected to an analog to digital circuit, and driven with a loading mode. Each individual sensor is individually driven.

In the example implementation of system configuration 200, the array of sensors 204 are connected individually to an interface 204 of information handling system 100. The interface 204 includes one or more touch controllers 206. Shown are touch controller 206-1 and a touch controller 206-2. The interface 204 further includes a touch micro controller unit (MCU) 208. The touch controllers 206 and touch MCU 208 are further described below.

In this implementation, the touch controller 206-1 communicates with Inter-Integrated Circuit (I2C) communication component 210, and the touch controller 206-2 communicates with a transmit component 212. The I2C communication component 210, and the transmit component 212 communicate with a system of a chip (SoC) component 214. The SoC component 214 communicates to ROM 216 and RAM 218. The components described in FIG. 2 can be implemented as part of or included with components as described in FIG. 1.

Figure 3:
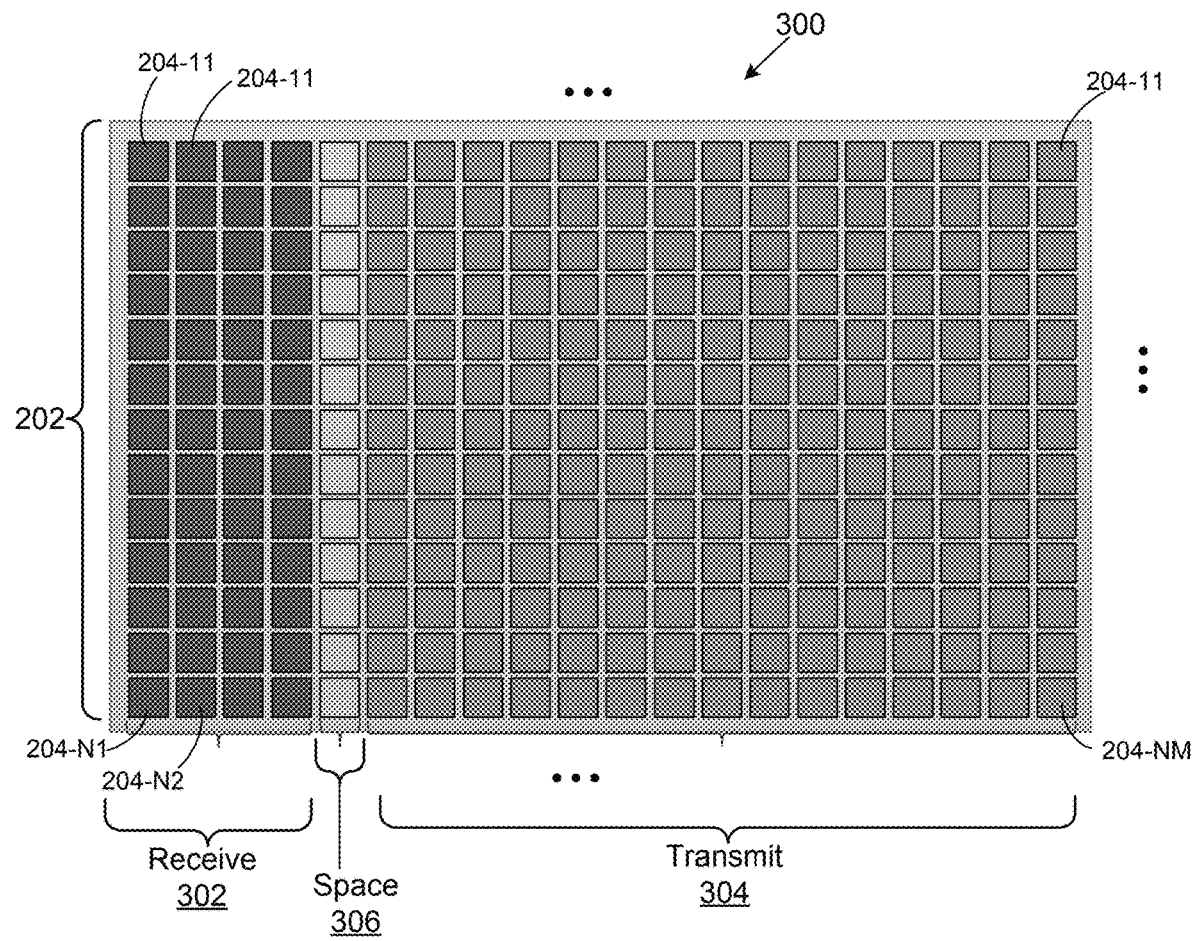
FIG. 3 is a configuration for an array of sensors of a touchscreen as implemented in the present invention.

FIG. 3 is an example configuration for an array of sensors of a touchscreen as implemented in the present invention. The configuration 300 can be implemented when the touchscreen 202 (i.e., laptop or notebook PC) is in proximity sensing mode and provides shunt mode sensing. As further described herein, configuration of the array of sensors 204 can be switched to a normal touch action mode, wherein a finger or pointing device that touches the sensors 204 is tracked. Implementations provide for the touch micro controller unit 208 to perform the necessary configurations.

Implementations provide for the array of sensors 204 of the touch screen 202 to be grouped as receive sensors 302 and transmit sensors 304. Ther can be a group of space sensors 306 between the group of receive sensors 302 and the group of transmit sensors 304.

In normal mode, where a user's finger or pointing device is tracked, the groups of receive sensors 302, transmit sensors 304, and space sensors are driven at the same at the same time. When a user's finger (pointing device) approaches a sensor, a change in capacitance (ΔC) is induced, and the finger is sensed.

As to proximity detection, the size or the number of sensors 204 included in the groups of receive sensors 302, transmit sensors 304, and space sensors 306 can be determined based on optimizing a signal to noise ratio (SNR). It is expected that the number and the area of the group of transmit sensors 304 will be greater than the number and area of the group of receive sensors 302. Capacitive sensing measures change in capacitance, the distance is a factor based on the parallel plated capacitor equation: $C=\varepsilon(Ad/)$. With an appropriately configured transmit and receive area (i.e., sensor configuration), proximity detection is achieved.

Figure 4:
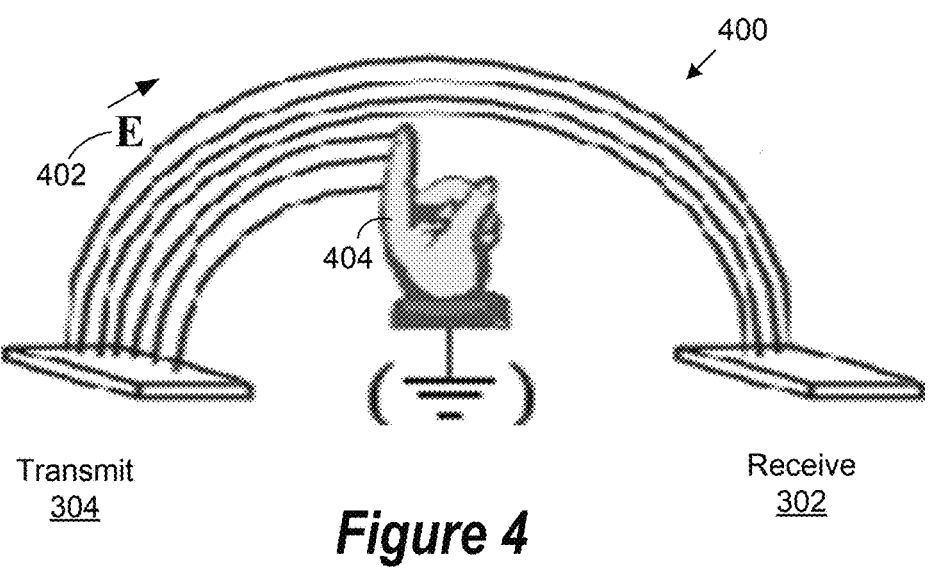
FIG. 4 is shunt mode operation for proximity detection.

FIG. 4 illustrates shunt mode operation 400 for proximity detection. When a laptop or notebook PC (i.e., information handling system) is in idle mode, proximity detection is made available. The group of transmit sensors 304 is driven to provide electrical energy that is received by the group of receive sensors 302, creating an electric field E 402. When a grounded finger or pointing device 404 interacts or breaks the electric field E 402, the touchscreen detects a user. The laptop or notebook PC (i.e., information handling system) then reverts to normal mode after detection.

Figure 5:
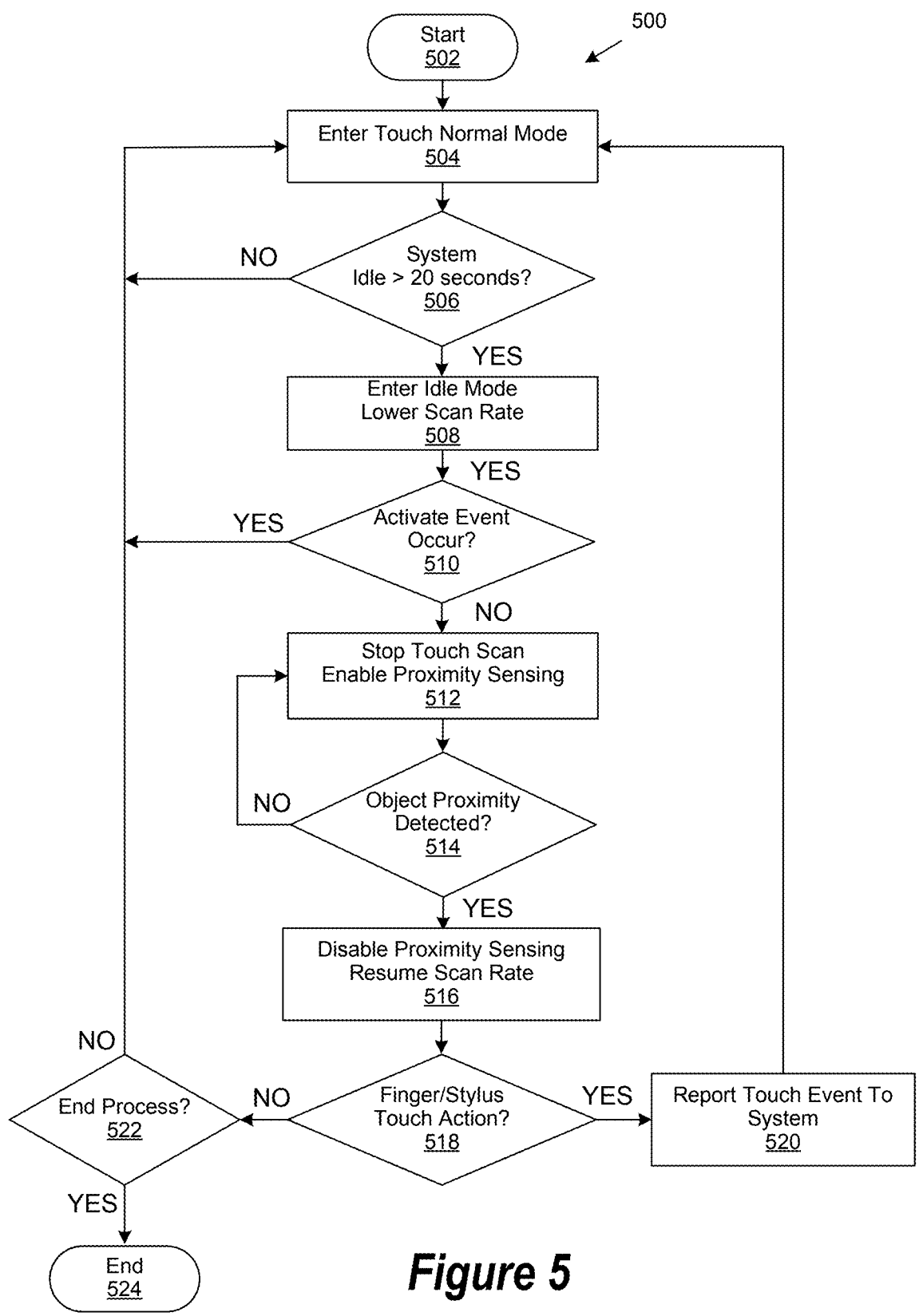
FIG. 5 is a generalized flowchart for switching touchscreen mode from normal to proximity detecting.

FIG. 5 is a generalized flowchart for switching touchscreen mode from normal to proximity detecting. The workflow 500 can implement the components as described herein. Furthermore, the steps can be implemented in memory, including firmware as described in FIG. 1. The order in which the method is described is not intended to be construed as a limitation, and any number of the described method steps may be combined in any order to implement the method, or alternate method. Additionally, individual steps may be deleted from the method without departing from the spirit and scope of the subject matter described herein. Furthermore, the method may be implemented in any suitable hardware, software, firmware, or a combination thereof, without departing from the scope of the invention.

At step 502, the process 500 starts. At step 504, the laptop or notebook PC (i.e., information handling system) enters a touch normal mode, where a user is able to use the touchscreen 202 as a user interface to navigate/interact with the laptop or notebook PC (i.e., information handling system).

At step 506, a determination is made if no touch event has occurred for greater than 20 seconds (or other determined time). In other words, a determination is performed whether the user has not interacted with the touchscreen 202 or has not interacted with the laptop or notebook PC (i.e., information handling system). Implementations provide for the touch controllers 206 to perform the determination. If the idle time is not greater than 20 seconds (or predetermined time), following the "NO" branch of step 506, step 504 is performed.

If idle time is greater than 20 seconds (or predetermined time), following the "YES" branch of step 506, at step 508, idle mode is entered into, and scan rate is lowered. In certain implementations, touch controllers 206 performs or instructs the laptop or notebook PC (i.e., information handling system) to go into idle mode, and lowers scan rate, for example from 120 Hz to 20 Hz. Idle mode is entered for power savings.

At step 510, a determination is made if an activate event has occurred. This event can be a finger/pointer touch, keyboard event (e.g., button push), a mouse or I/O device activation, etc. If an activate event is determined, following the "YES" branch of step 510, step 504 is performed.

If an activate event is not determined, following the "NO" branch of step 510, at step 512 touch scan or normal mode is stopped, and the touchscreen (laptop or notebook PC) enters proximity detection or sensing mode. The sensors 204 are grouped into groups of receive sensors 302, transmit sensors 304, and space sensors 306. Shunt mode as described in FIG. 4 is activated. In various implementations, the touch MCU 208 reconfigures an analog readout channel to shunt mode and enable the three dimensional proximity detection or sensing.

At step 514, a determination is made if through proximity detection if an objected is detected. If no object is detected, following the "NO" branch of step 514, step 512 is performed. If an object is detected, following the "YES" branch of step 514, at step 516, proximity detection or sensing mode is disabled, and the touchscreen (laptop or notebook PC) enters normal or scanning mode. The sensors 204 are configured or all grouped as scanning sensors for normal mode. In particular implementations, the touch MCU 208 disables proximity detection or sensing mode and enables normal mode.

At step 518, a determination is made if a finger or pointing device (e.g., stylus) action has been performed on the touchscreen 202. If it is determined that a finger or pointing device (e.g., stylus) action has been performed, following the "YES" branch of step 518, at step 520, the touch event is reported to the system (i.e., laptop or notebook PC). Step 504 is performed.

If it is determined that a finger or pointing device (e.g., stylus) action has not been performed, following the "NO" branch of step 518, at step 522, a determination is made if the process 500 ends. If the process 500 continues, following the "NO" branch of step 522, step 504 is performed. If the process 500 ends, following the "YES" branch of step 522, at step 524, the process 500 ends.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or step diagrams of methods, apparatus (systems) and computer program products according to embodiments of the invention. It will be understood that each step of the flowchart illustrations and/or step diagrams, and combinations of steps in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram step or steps.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for switching touchscreen mode from normal to proximity detecting comprising:
    determining if touchscreen of a system is in normal mode;
    entering an idle mode if system has been inactive for a certain time period;
    providing proximity detecting if the system has been inactive for the certain time period, wherein proximity detecting comprises:
        grouping sensors of the touchscreen as transmit sensors, receive sensors, and space sensors separating the transmit and receive sensors, wherein the number or size of the transmit sensors and the receive sensors are determined based on an optimized signal to noise ratio and the group of transmit sensors are larger in number or size than the group of receive sensors;
        driving the transmit sensors and receive sensors to create an electric field;
        detecting a user when a finger or pointing device enters the electric field; and
    switching to a normal or scanning mode a detecting the user occurs.

2. The computer-implementable method of claim 1, wherein the scan rate and display rate are lowered when system is in idle mode.

3. The computer-implementable method of claim 1, wherein normal mode is entered if an activate event is entered or the system has not been inactive for the certain time period.

4. The computer-implementable method of claim 1, wherein providing proximity detecting further comprises grouping the sensors of the touchscreen as space sensors between the group of transmit sensors and group of receive sensors.

5. The computer-implementable method of claim 1, wherein the number of sensors grouped as transmit sensors is greater than the number of sensors grouped as receive sensors.

6. The computer-implementable method of claim 1, wherein a touch multi controller unit (MCU) performs the proximity detecting.

7. The computer-implementable method of claim 1, wherein switching to a normal or scanning mode comprises grouping the sensors as scanning sensors.

8. A system comprising:
    a processor;
    a data bus coupled to the processor; and
    a non-transitory, computer-readable storage medium embodying computer program code, the non-transitory, computer-readable storage medium being coupled to the data bus, the computer program code interacting with a plurality of computer operations for switching touchscreen mode from normal to proximity detecting and comprising instructions executable by the processor and configured for: initiating a user program comprising;
    determining if touchscreen of a system is in normal mode;
    entering an idle mode if system has been inactive for a certain time period;
    providing proximity detecting if the system has been inactive for the certain time period, wherein proximity detecting comprises:
        grouping sensors of the touchscreen as transmit sensors, receive sensors, and space sensors separating the transmit and receive sensors, wherein the number or size of the transmit sensors and the receive sensors are determined based on an optimized signal to noise ratio and the group of transmit sensors are larger in number or size than the group of receive sensors;
        driving the transmit sensors and receive sensors to create an electric field;
        detecting a user when a finger or pointing device enters the electric field; and
    switching to a normal or scanning mode a detecting the user occurs.

9. The system of claim 8, wherein the scan rate and display rate are lowered when system is in idle mode.

10. The system of claim 8, wherein normal mode is entered if an activate event is entered or the system has not been inactive for the certain time period.

11. The system of claim 8, wherein providing proximity detecting further comprises grouping the sensors of the touchscreen as space sensors between the group of transmit sensors and group of receive sensors.

12. The system of claim 8, wherein the number of sensors grouped as transmit sensors is greater than the number of sensors grouped as receive sensors.

13. The system of claim 8, wherein a touch multi controller unit (MCU) performs the proximity detecting.

14. The system of claim 8, wherein switching to a normal or scanning mode comprises grouping the sensors as scanning sensors.

15. A non-transitory, computer-readable storage medium embodying computer program code for switching touchscreen mode from normal to proximity detecting, the computer program code comprising computer executable instructions configured for:
  determining if touchscreen of a system is in normal mode;
  entering an idle mode if system has been inactive for a certain time period;
  providing proximity detecting if the system has been inactive for the certain time period, wherein proximity detecting comprises:
    grouping sensors of the touchscreen as transmit sensors, receive sensors, and space sensors separating the transmit and receive sensors, wherein the number or size of the transmit sensors and the receive sensors are determined based on an optimized signal to noise ratio and the group of transmit sensors are larger in number or size than the group of receive sensors;
    driving the transmit sensors and receive sensors to create an electric field;
    detecting a user when a finger or pointing device enters the electric field; and
    switching to a normal or scanning mode a detecting the user occurs.

16. The non-transitory, computer-readable storage medium of claim 15, wherein the scan rate and display rate are lowered when system is in idle mode.

17. The non-transitory, computer-readable storage medium of claim 15, wherein normal mode is entered if an activate event is entered or the system has not been inactive for the certain time period.

18. The non-transitory, computer-readable storage medium of claim 15, wherein providing proximity detecting further comprises grouping the sensors of the touchscreen as space sensors between the group of transmit sensors and group of receive sensors.

19. The non-transitory, computer-readable storage medium of claim 15, wherein the number of sensors grouped as transmit sensors is greater than the number of sensors grouped as receive sensors.

20. The non-transitory, computer-readable storage medium of claim 15, wherein switching to a normal or scanning mode comprises grouping the sensors as scanning sensors.

\* \* \* \* \*